(12) United States Patent
Luvini et al.

(10) Patent No.: US 6,193,557 B1
(45) Date of Patent: Feb. 27, 2001

(54) CHIP CARD CONNECTOR

(76) Inventors: Rocco Luvini, Contrada di Mezzo, CH-6984 Pura (CH); Riccardo Gazzi, Via Prada No. 6, 21037 Lavena Ponte-Tresa (IT)

( * ) Notice: Subject to any disclaimer, the term of this patent is extended or adjusted under 35 U.S.C. 154(b) by 0 days.

(21) Appl. No.: 09/283,557

(22) Filed: Apr. 1, 1999

(51) Int. Cl.⁷ .................................................. H01R 24/00
(52) U.S. Cl. ........................................... 439/630; 439/326
(58) Field of Search ................................... 439/630, 631, 439/325, 331, 946, 326; 235/486, 482, 483, 484, 485

(56) References Cited

U.S. PATENT DOCUMENTS

| | | | |
|---|---|---|---|
| 4,820,186 | 4/1989 | Fujii | 439/326 |
| 5,320,552 | 6/1994 | Reichardt et al. | 439/331 |
| 5,603,629 | 2/1997 | DeFranse et al. | 439/331 |
| 5,743,766 * | 4/1998 | Kaneshige et al. | 439/630 |

* cited by examiner

Primary Examiner—Neil Abrams
Assistant Examiner—Michael C. Zarroli
(74) Attorney, Agent, or Firm—Hoffmann & Baron, LLP

(57) ABSTRACT

An electrical connector provides for the connection of the contact pads of an IC card to conductive elements of a printed circuit board. The connector includes a base supportable on the printed circuit board and at least one elastomeric element assembled within the base and aligned with upper and lower surfaces thereof. The base provides at least one retention tooth from which an IC card is easily withdrawn using a blunt implement, thereby obviating the need for a separate cover to retain the card in the device. The base also provides two additional fingers which bias inward against a side of a card and transversely apply forces on the card in order to annul the width differences among different cards. The elastomeric element is fabricated from a polymer which facilitates electrical interconnection between the element and the contacts on the SIM card. The elastomeric element replaces metal contacts which are widely utilized in conventional IC card readers. However, the same holder can accommodate metal contacts for those manufacturers not yet employing elastomeric contact technology.

13 Claims, 4 Drawing Sheets

CHIP CARD CONNECTOR

FIELD OF THE INVENTION

The present invention relates generally to an electrical connector which supports an integrated circuit (IC) card to a printed circuit board. More particularly, the present invention is directed to a chip card connector which reduces the number of components for manufacture and assembly and provides for easy contact using polymeric contact elements.

BACKGROUND OF THE INVENTION

The electronic industry has seen growth in the use of flat plastic cards incorporating computer chips therein. These chip or IC cards are also commonly referred as to as "smart cards". A smart card is a card incorporating at least one electronic component to which electrical connection must be made. These cards include contact pads so as to allow electrical connection to the electronic component on the card. Smart cards are commonly used in various consumer oriented machines such as telephones, bank machines, vending machines and the like.

One particular type of smart card commonly used in telephones, especially personal portable telephones, is a mini-card or a mini-SIM (subscriber identity module) card. These cards have a particular industry-accepted standard for size, shape and location of the electronic components and contact pads. These mini-SIM cards are typically installed in the apparatus, such as a cellular phone, by a trained installer.

In order to effect electrical connection between the mini-SIM card and a printed circuit board within the phone, an electrical connector is employed. These connectors also are manufactured in an industry-accepted configuration so that the mini-SIM card may be accommodated by the connector. However, for various purposes, such as for example, to change the subscriber identity, it may be necessary to replace the mini-SIM card within the phone. Thus, the electrical connector used to support the mini-SIM card in the phone must permit the easy replacement of cards therein.

The art has seen numerous electrical connectors specifically designed for use in removably connecting various types of smart cards. In addition, a reader for chip cards with fixed contacts is known, but where the contacts wipe the card along the entire insertion length and thus it is used only in special cases. Typical connector configurations utilize a combination of a base and cover as shown in FIGS. 1 and 1A. FIG. 1 shows a card connector 10 as disclosed in commonly assigned patent application having Ser. No. 08/938,305, filed Sep. 26, 1997 and incorporated by reference herein. Connector 10 is shown prior to assembly with a printed circuit board (PCB) 11. PCB 11 includes a substantially planar base 13 which supports a parallel reading unit 15 thereon. Reading unit 15 has a plurality of metallic contacts 17 protruding therefrom with which a contact pad on a chip card establishes an electrical connection to the PCB. Each contact 17 includes a spring element for deflectable electrical engagement with the contact pad of the IC card and contact tail for termination to PCB 11. Each contact 17 extends from peripheral edges 19 of reading unit 15 to an interior reading area 21 defined in an intermediate area of reading unit 15.

As seen in FIG. 1 and further shown in FIG. 1A, connector 10 includes a planar connector base 12 having a planar connector cover 14 hingedly affixed thereto. Connector base 12 is generally parallel to base 13 of PCB 11 so as to ensure a proper fit thereon. Base 12 includes an intermediate region 16 which allows contacts 17 to protrude through reading area 21 of base 13 and into a plane defined by connector base 12.

Connector cover 14 swings in rotatable relation to base 12. Cover 14 has a smooth upper surface 14a and a lower surface 14b from which at least one latching portion 14c extends. An IC card is insertably supported by cover 14 for movement therewith. Upon insertion of the card in cover 14, cover 14 is rotated toward the upper surface of base 12 and closed therewith. The card is inserted into cover 14 with its contact side facing the base 12 so that electrical contact is effected upon closure of the cover. Each latching portion 14c defines a groove therein which accommodates the IC card in the cover. The latching portions are used to lock the cover and the base so that the pad of the IC card remains in electrical engagement with contacts 17.

Although the aforedescribed connector effectively establishes electrical contact between an IC card and a PCB, its use may not be desirable in configurations where conservation of materials and space is essential. The above design requires at least two housing components which must subscribe to the particular dimensions of a chip card inserted therein. Two additional components are required for construction of the reading guide. In addition, a soldering process is required to fix the connector to the PCB. The required number of components and the extra soldering step required to complete assembly of the chip card reader to a PCB contribute to increased costs associated with manufacture of such reading devices. In addition, the number of parts in the assembly contributes to increased device thickness and increased outside dimensions. Such increased dimensions contribute to problems of packaging the device within an already crowded PCB configuration.

Furthermore, during installation it is quite common for the installer to select a particular SIM card for installation into a particular connector. As a result of transporting, handling and installing such a card, there is a tendency for the contact pads on the card to accumulate dust and debris. Such accumulation may adversely affect the interconnection between the contact pads on the card and the contacts in the connector. Simple rotational movement of the card into engagement with contacts of the base does little to assure clean connection therebetween. Furthermore, as the cover is locked to the base in a separate operation, mechanical connection of the card to the connector is not always assured even where electrical connection is established. Over time the chip card could dislodge from the connector without prior warning.

Thus, it is desirable to provide a chip card reading device which obviates the need for a combination of a cover and base and which implements fewer contacts so as to effect a satisfactory electrical connection using a minimum number of components.

SUMMARY OF THE INVENTION

It is an object of the present invention to provide an electrical connector for insertably connecting an IC card.

It a further object of the present invention to provide an electrical connector which supports an IC card for movement into connection with contacts supported by the connector.

It is still a further object of the present invention to provide an electrical connection for a chip card which eliminates engagement between metal contact locations on the chip card and the contacts of the connector to assure proper electrical connection therebetween.

It is yet another object of the present invention to reduce the number of components needed to establish an electrical connection between a chip card and a connector, yet still ensure proper electrical connection therebetween.

It is still a further object of the present invention to eliminate unnecessary processes such as soldering which contribute to the complexity and cots of manufacturing chip card reading devices.

In the efficient attainment of these and other objects, the present invention provides an electrical connector for connecting a contact pad of an IC card to a printed circuit board. The present invention is based on the problem of creating a reader for chip cards in which the scraping of the contacts across the card and in particular the chip is prevented during insertion of the card. The present invention is also directed to the problem of electrical apparatus packaging, wherein it is desirable to optimize use of available space to accommodate more functions, and thereby more components, in the apparatus. The present invention addresses the need to reduce the current number of components while simultaneously increasing the available packaging space in the device to accommodate improvements thereof.

By means of this invention, a reader for chip cards is provided which requires only two components for effective contact with and retention of a SIM card. One component is a holder or base having a single body instead of a reading unit and card guide combination. The base defines a cavity therein for acceptance of a SIM card or IC card. The card is fixed in the cavity with resilient retention members integrally formed with the base. Such retention members include a pair of cantilevered springs with retention teeth at the distal ends thereof for engagement with an upper surface of the IC card. The springs are integrally formed along a peripheral wall of the base. The retention members further include a pair of longitudinal fingers extending along an opposed peripheral wall of the base. The fingers bias inward, and each finger has a digit at a distal end thereof which applies lateral forces to a card edge so as to ensure retention of the card in the cavity. The card can thus be simply withdrawn using a blunt implement, thereby obviating the need for a separate cover to retain the card in the device and further annulling the width differences among different cards.

The other component is an elastomeric element which is assembled within the base and aligned with upper and lower surfaces thereof. The elastomeric element is fabricated from a polymer which facilitates electrical interconnection between the element and the contacts on the SIM card. The elastomeric element replaces metal contacts which are widely utilized in conventional IC card readers. However, a similar base can accommodate metal contacts for those manufacturers not yet employing elastomeric contact technology.

DETAILED DESCRIPTION OF THE PREFERRED EMBODIMENT

The present invention provides for an integrated chip (IC) card connector which reduces the number of components required to establish an electrical connection between a contact pad on the card and corresponding conductive elements of a printed circuit board (PCB). The connector requires two components, namely a base made of a suitable insulative plastic and at least one elastomeric element housed therein for establishing electrical contact between the card and the PCB. A single body is implemented in place of a conventional reading unit and card guide combination to reduce the construction and assembly costs associated with production and installation of chip card reading devices and also to decrease the connector's thickness and outside dimensions while ensuring an efficient electrical connection.

Now referring to FIGS. 2–8, a preferred embodiment of the present invention can now be described.

Figure 2:
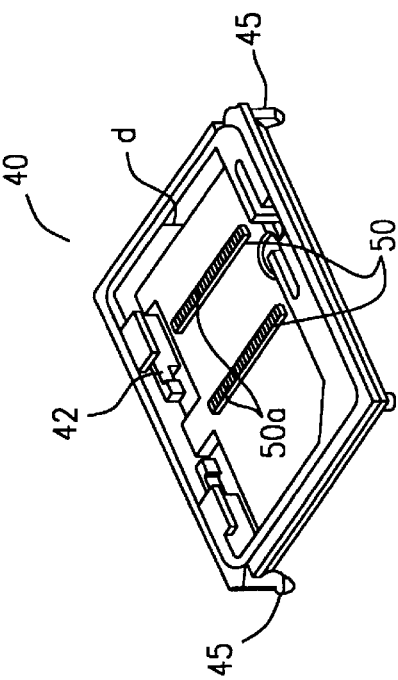
FIG. 2 is a top perspective view of a preferred embodiment of the connector of the present invention prior to assembly of its components.

A chip card connector 40 of the present invention is provided in FIG. 2. Connector 40 includes a base 42 having a substantially planar upper surface 42a, a parallel bottom surface 42b and a length l and width w which define the surrounding within which a chip card is inserted into the connector. The surrounding is defined by a peripheral wall 42c that demarcates a cavity 44 having a depth d which corresponds to chip cards of standard thickness. At least one support leg 45 may protrude from bottom surface 42b for affixing the connector to a printed circuit board, such as PCB 11 shown in FIG. 1.

Base 42 further includes at least one elongate aperture 47 such that the number of apertures coincides with a corresponding number of elastomeric electrical contacts 50. Each aperture 47 extends from upper surface 42a through to bottom surface 42b. The apertures are laterally spaced from one another so as to correspond to a contact pad on an IC card placed thereadjacent (not shown). Each aperture 47 may include one or more lateral protrusions 47a which apply a lateral force to an elastomeric element inserted therein. Protrusions 47a are defined so as to retain the elements within apertures 47 yet enable easy retraction of electrical contacts 50 therefrom.

Each of electrical contacts 50 is made from an electrically conductive material and is well known in the art. Such a layer may be made from the combination of an elastic insulative polymeric material and a conductive material, such as a plurality of conductive flakes, as disclosed in commonly assigned U.S. Pat. No. 5,871,842 and incorporated by reference herein. The insulative material is selected from materials such as silicone rubber or a thermoplastic polyolefin elastomer which provide good chemical resistance and can be reheated and reshaped for future use. The conductive flakes may be fabricated of a conductive or semiconductive material such as silver, nickel or carbon.

The size of the flakes varies with the level of conductivity required for a particular application, and particularly with respect to establishment of a sufficient electrical connection between the elastomeric element and a chip card in contact therewith.

Figure 3:
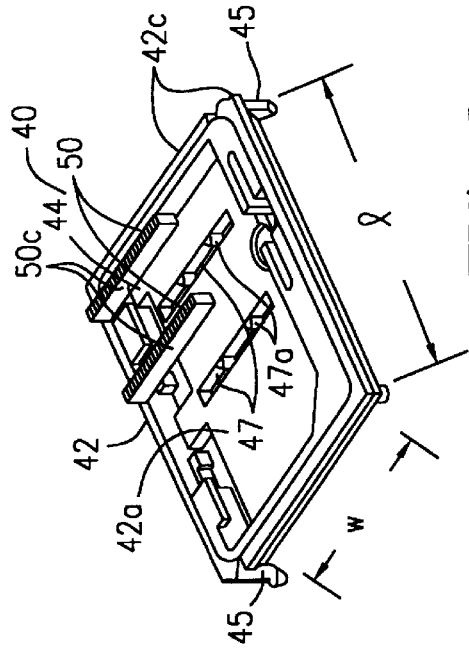
FIG. 3 is a top perspective view of the connector of FIG. 2 after assembly.
Figure 4:
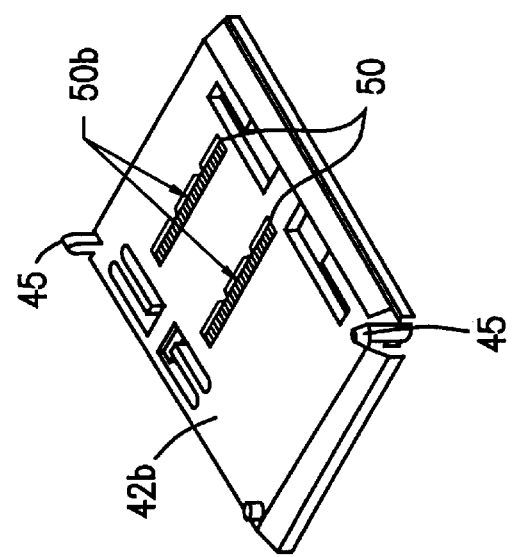
FIG. 4 is a bottom perspective view of the connector of FIG. 3 showing alignment of the assembled components.

Referring to FIGS. 3 and 4, each of electrical contacts 50 has a interior contact extent 50a for electrical engagement with a contact pad of an IC card, an exterior contact extent 50b for termination to a PCB and a peripheral surface 50c extending therebetween (shown in FIG. 2). Electrical contacts 50 are assembled with base 42 by fitting the elements 50 within apertures 47 as shown. As can be seen in FIG. 4, it is important to align interior and exterior contact extents 50a and 50b, respectively, with the upper and lower surfaces 42a and 42b of base 42, respectively. Such alignment ensures securement of the contacts in their corresponding apertures and proper electrical connection between the contacts and the contact pad on an IC card in engagement therewith.

Figure 6:
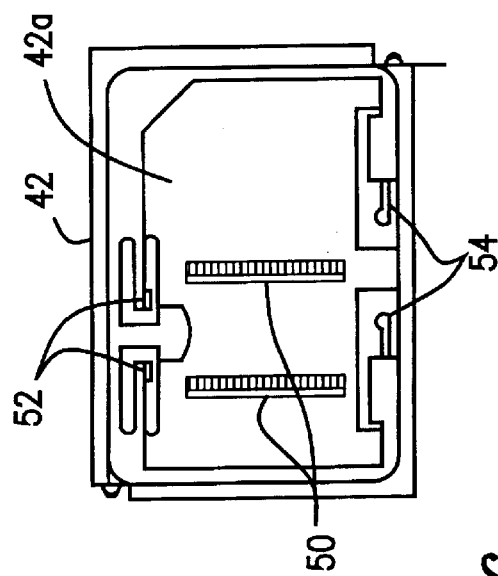
FIG. 6 is an upper plan view of the connector of FIG. 3 showing the assembled components.
Figure 7:
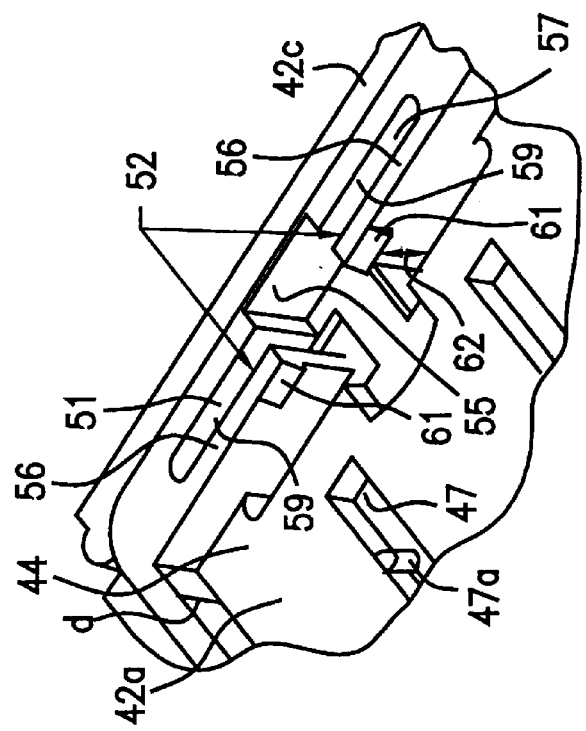
FIG. 7 is an exploded view of the connector of FIG. 6 having retention teeth to retain an IC card therein.

Resilient retention members are integrally provided in base 42 that enable capture and restraint of a chip card in cavity 44. These retention members are more fully disclosed in FIGS. 6, 7 and 8. Referring to FIGS. 6 and 7, upper surface 42a of base 42 integrates a locking system for an IC card which includes a pair of cantilever springs 56, each cantilever having a retention tooth 52 at a distal end thereof. Base 42 further integrates a pair of opposed cantilevered springs in the form of longitudinal fingers 54. Teeth 52 and fingers 54 provide releasable resilient securement of an IC card in cavity 44 and position a control pad on such card in electrical engagement with electrical contacts 50.

Further referring to FIG. 7, cantilevers 56 and retention teeth 52 are more easily seen. Each retention tooth is defined on a cantilever 56 which lies parallel to one of a pair of side walls 55 and 65 defined by peripheral wall 42c. Cantilevers 56 extend from one side wall 55 for resilient securement of an IC card between the cantilevers and opposed side wall 65. As depicted, each tooth is preferably a downwardly directed protrusion that is orthogonally integrated with a corresponding cantilever 56. Cantilevers 56 define a space 57 between the teeth and an edge 59 of side wall 55. Space 59 accommodates deflection of cantilevers 56 therethrough which occurs in response to insertion of a chip card in cavity 44.

Each tooth 52 defines an overbite 61 providing a clearance 62 therebeneath. Depth d of cavity 44 exceeds clearance 62 by an amount equal to the cross-sectional width of overbite 61. Such clearance can be varied in relation to the size and type of standard chip card anticipated for use with the present invention connector.

Figure 8:
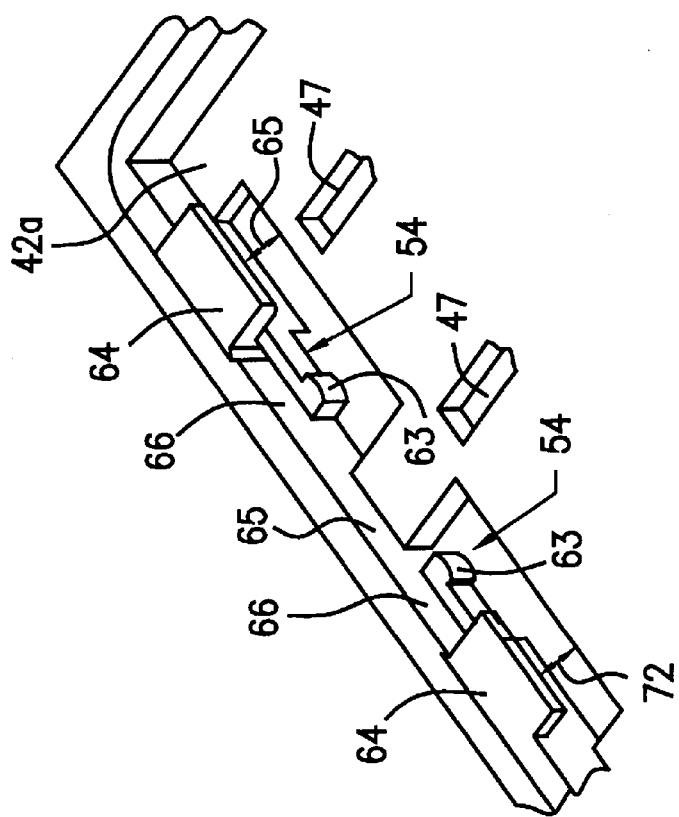
FIG. 8 is an exploded view of the connector of FIG. 6 having a pair of longitudinal fingers to accommodate IC cards of varying widths.

Now referring to FIG. 8, upper surface 42a of base 42 also defines a pair of longitudinally extending fingers 54 lying parallel to a second side wall 65 defined within peripheral wall 42c. Fingers 54 extend from opposed side wall 65 and lie opposite side wall 55 and further opposite retention teeth 52, so that an IC card in cavity 44 is resiliently secured between fingers 54 and cantilevers 56.

Each finger 54 defines a substantially orthogonal digit 63 thereon which applies a lateral force to an edge of an IC card inserted thereagainst. Each finger 54 runs from an awning 64 that defines a second clearance 72 thereunder, such that clearance 72 accommodates a thickness of a standard chip card and such card engages with awnings 64 for insertion thereunder. Fingers 54 are deflectable through a space 66 toward side wall 65 in response to insertion of a chip card in cavity 44 so as to accommodate insertion of an IC card thereagainst. Such deflectable movement annuls the width difference between different chip cards.

The operation of the present invention connector can now be described. Unlike connectors utilizing a base and cover combination, connector 40 can simply accept a chip card in cavity 44 therein. It is important that the surface of the chip card having contact pads thereon is face down in relation to upper surface 42a of base 42 so as to align electric contacts 50 with the contact pads of the chip card.

An IC card is preferably inserted at an angle acute to the plane in which upper surface 42a lies. An edge of the card is placed under awnings 64 and pushed in so that fingers 54 apply lateral forces to the card edge via digits 63. Upon clearing each of retention teeth 52, the card can be dropped into cavity 44, the card being insertable in cavity 44 against the bias of fingers 54. Fingers 54 will push the card toward retention teeth 52 so that the card is retained within clearance 62 under overbites 61 and retention teeth 52 engage with an upper surface of the card. Cantilevers 56 can deflect with respect to the movement of the card in a direction transverse to side wall 55 so as to accommodate the card within clearance 61. Fingers 54 continue to apply a force to the card edge which ensures locking of the card by the overbites.

To facilitate extraction of the card from base 42, a blunt implement may be used to press the card against the lateral force applied by fingers 54 so as to cause the fingers to deflect towards side wall 65. Such deflection results in sliding of the card in a direction opposite to that in which the card was originally inserted under overbites 61. The card retreats from clearance 62 into clearance 72 and clears overbites 61. When pressure is released from the card, digits 63 press against the card edge in a direction away from side wall 65. In this manner, cards having varying widths can be easily installed, and faulty cards can likewise be quickly replaced without replacement of individual metal contacts.

Figure 1:
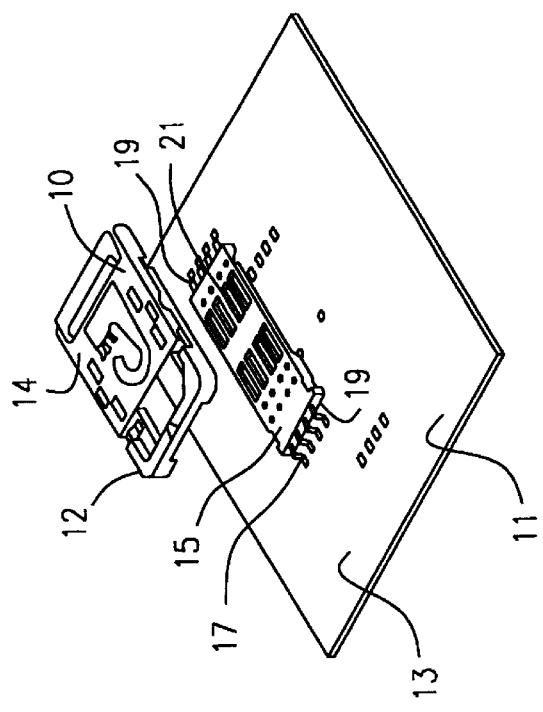
FIG. 1 is a top perspective view of a connector of the prior art having a card guide and being inserted onto a printed circuit board.
Figure 1A:
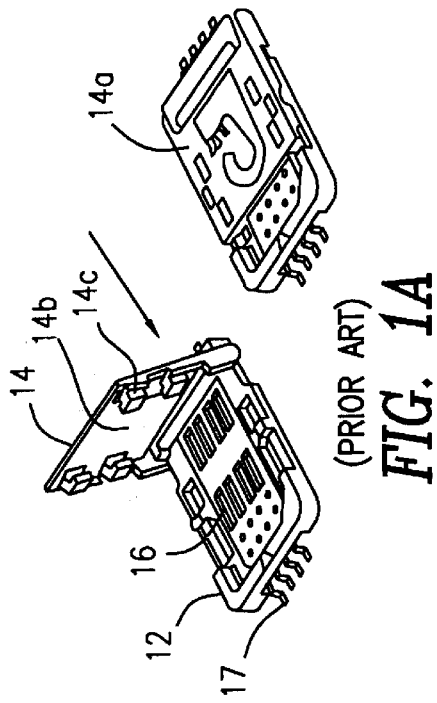
FIG. 1A is a top perspective view of the connector of FIG. 1 having a rotatable cover which is opened and closed to accommodate electrical connection with an IC card that is placed therein.
Figure 5:
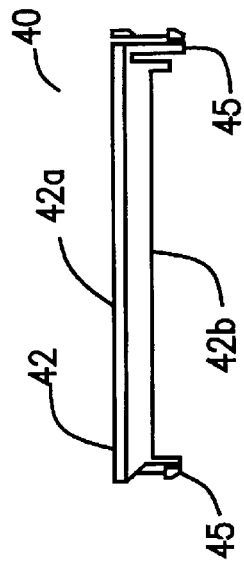
FIG. 5 is a side view of the connector of FIG. 3.
Figure 9:
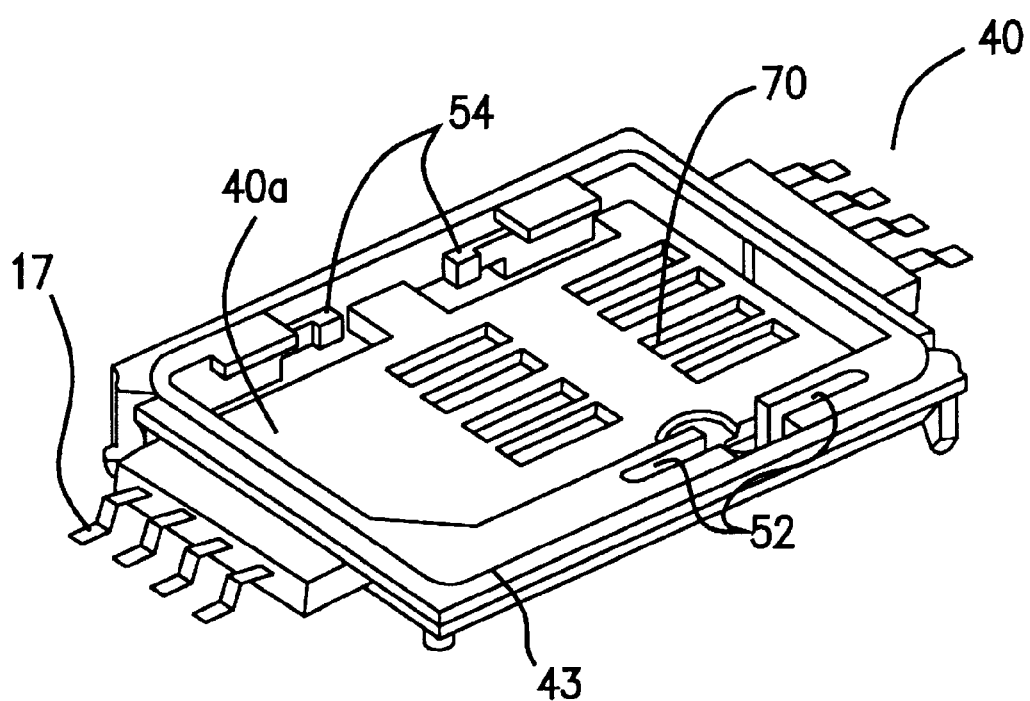
FIG. 9 is an alternate preferred embodiment of an IC card connector of the present invention accommodating conventional metal contacts.

In another preferred embodiment shown in FIG. 9, the present invention can also be implemented with conventional metal contacts 17 such as those shown in FIG. 1. Connector 40 is shown having a base 42 with an upper surface 40a and with retention teeth 52 and fingers 54 defined thereon as before. However, a plurality of apertures 70 are defined in upper surface 40a which extend therefrom to a bottom surface 40b. A corresponding plurality of metal contacts 17 are projected through apertures 70, wherein such contacts are fixed to a PCB such as PCB 11 shown in FIG. 1, or integrated with base 42 in combination with the other features of the invention. This alternative allows adaptation of the present invention to incorporate metal reading units for situations in which elastomeric elements are not desired.

While the particular embodiments of the present invention have been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An electrical connector for establishing electrical connection between a contact pad of an IC card and conductive elements of a printed circuit board, comprising:
   a connector housing having a substantially planar base supportable on said printed circuit board, said base having an upper surface, a lower surface and a peripheral wall extending about said upper surface defining an open cavity for insertably accommodating said IC card therein; and at least one elongate electrical contact supported by said base, said contact including an interior contact extent for electrical engagement with said contact pad of said IC card and an exterior contact extent for termination to said printed circuit board; and a resilient retention member for providing releasable resilient securement of said IC card in said cavity, and for positioning said control pad of said IC card in electrical engagement with said electrical contact supported by said base;

wherein said peripheral wall includes a pair of opposed side walls and wherein said resilient retention member extends from one said side wall for resilient securement of said IC card between said resilient retention member and said opposed side wall, said resilient retention member further including at least one elongate cantilevered spring integrally formed on said side wall such that said IC card is insertable into said cavity against the bias of said spring wherein said cantilevered spring includes a laterally extending retention tooth formed at a distal end thereof for engagement with an upper surface of said IC card.

2. The connector of claim 1 wherein said distal ends of said cantilevered springs are mutually inwardly directed.

3. The connector of claim 1 wherein said retention member further includes an opposed cantilevered spring extending from said opposed side wall, said IC card being resiliently secured between said cantilevered spring of said one wall and said opposed cantilevered spring of said opposed wall.

4. The connector of claim 3 wherein each said cantilevered spring includes a longitudinally extending finger integrated with said base for accommodating insertion of said IC card thereagainst.

5. The connector of claim 4 wherein each finger includes a substantially orthogonal digit integrally formed at a distal end thereof for engagement with an edge surface of said IC card.

6. The connector of claim 5 wherein said fingers define a space in relation to said peripheral wall for accommodating deflection of said fingers therethrough.

7. The connector of claim 6 wherein each finger extends from an awning for engagement with an upper surface of said IC card.

8. The connector of claim 1 wherein said base includes at least one aperture therethrough for retention of said electrical contact therein.

9. The connector of claim 8 wherein said interior contact extent is aligned with said upper surface of said base and said exterior contact extent is aligned with said lower surface of said base to ensure securement of said contact in said aperture.

10. The connector of claim 1 wherein said electrical contact is an elastomeric contact member.

11. The connector of claim 10 wherein said elastomeric contact member includes an insulative portion selected from the group of materials consisting of silicone rubber and thermoplastic polyolefin elastomer.

12. The connector of claim 1 wherein said contact member includes a conductive portion thereon.

13. The connector of claim 12 wherein said conductive portion is selected from the group of materials consisting of silver, nickel or carbon.

* * * * *